United States Patent

Kitaura et al.

Patent Number: 4,819,381
Date of Patent: Apr. 11, 1989

[54] WEATHERSTRIP FOR VEHICLE CLOSURES

[75] Inventors: Kazuhiko Kitaura, Zama; Satoru Ugawa, Hadano; Kouzi Ogawa, Isehara, all of Japan

[73] Assignee: Nissan Motor Co., Ltd., Japan

[21] Appl. No.: 13,251

[22] Filed: Feb. 10, 1987

[30] Foreign Application Priority Data

Feb. 14, 1986 [JP] Japan .................................. 61-30444
Apr. 25, 1986 [JP] Japan .................................. 61-97383

[51] Int. Cl.⁴ .............................................. E06B 7/16
[52] U.S. Cl. ......................................... 49/493; 49/489
[58] Field of Search ................. 49/488, 489, 492, 498, 49/475, 493

[56] References Cited

FOREIGN PATENT DOCUMENTS

| 0167362 | 1/1986 | European Pat. Off. . |
| 0182318 | 5/1986 | European Pat. Off. . |
| 992673 | 5/1965 | United Kingdom . |
| 1479001 | 7/1977 | United Kingdom . |
| 1511947 | 5/1978 | United Kingdom . |
| 1540063 | 2/1979 | United Kingdom . |

Primary Examiner—Kenneth J. Dorner
Assistant Examiner—Gerald A. Anderson
Attorney, Agent, or Firm—Leydig, Voit & Mayer

[57] ABSTRACT

A glass holder made of a hard synthetic resinous material is embedded in a mounting base and a seal lip which are made of sponge rubber. The glass holder is supported at two points on the inner and outer end portions of a retainer so as to prevent a portion of the glass holder embedded in an outer lip portion from being swung outward.

11 Claims, 3 Drawing Sheets

WEATHERSTRIP FOR VEHICLE CLOSURES

BACKGROUND OF THE INVENTION

1. Field of the Invention

The present invention relates in general to weatherstrips for vehicle closures and more particularly to a weatherstrip for providing a seal between a roof side rail and a slidable window glass of a hardtop type vehicle door.

2. Description of the Prior Art

An example of a prior art weatherstrip of the above described kind is shown in FIGS. 4 to 6. Referring to the figures, a door 10 of a hardtop type vehicle has a sashless or frameless window opening 12 which is opened and closed by a slidable window or window glass 14. A roof side rail 16 of the vehicle is adapted to serve as a frame for the window opening 12 and consists of an outer roof side rail 16a and an inner roof side rail 16b which are joined together to form a closed roof side rail configuration.

A drip channel 18 is secured to the outer roof side rail 16a, and a retainer 20 having channel-shaped inner and outer end portions 20a, 20b is secured with screws 22 to the roof side rail outer 16a. A weatherstrip 24 made of sponge rubber is attached to the retainer 20 to provide a seal between the roof side rail 16 and the peripheral edge of the window glass 14. The weatherstrip 24 consists of a mounting base 24a and a seal lip 24b spanning between the opposite inner and outer ends of the mounting base 24a and cooperating with the mounting base 24a to form a hollow weatherstrip configuration so that, when the door 10 is swung closed and the window glass 14 is slid up to its closed position, the peripheral edge of the window glass 14 is brought into contact with the resilient seal lip 24b to provide a seal between the inside and outside of a vehicle cabin 26.

The weatherstrip 24 is provided with a glass holder 24c for preventing outward movement of the window glass 14 when the window glass 14 is urged outward (in the direction indicated by the arrow F) due to a pressure differential between the inside and outside of the vehicle cabin 26 during high-speed running of the vehicle. The glass holder 24c is made of a hard synthetic resinous material and formed integral with the mounting base 24a and the seal lip 24b, i.e., joined with the mounting base 24a and the seal lip 24b so as to form an integral unit therewith.

A disadvantage of the above described prior art weatherstrip is that since the glass holder 24c is hung at its upper end on the channel-shaped outer end portion 20b of the retainer 20, i.e., supported on the outer end portion 20b in a manner of a so-called cantilever, the glass holder 24c is liable to swing outward as represented by the two-dot chain line in FIG. 6 when the window glass 14 is urged outward. Since such swing allows the window glass 14 to move outward, the glass holder 24c cannot prevent the outward movement of the window glass 14 sufficiently and desirably.

Another disadvantage is that the repeated opening and closing of the door 10 (the peripheral edge of the window glass 14 follows a path as indicated by the line X—X in FIG. 5 upon opening and closing of the door 10) in a long period of usage is liable to cause a crack or cracks of the weatherstrip 24 in or adjacent the place where the glass holder 24c is joined with the mounting base 24a and the seal lip 24b, making it impossible to provide an assured and reliable seal.

SUMMARY OF THE INVENTION

In accordance with the present invention, there is provided a weatherstrip for providing a seal between a roof side rail and a slidable window of an automotive vehicle and adapted to be installed on the roof side rail by means of a retainer having channel-shaped inner and outer ends. The weatherstrip comprises a mounting base made of a relatively soft material and extending between the inner and outer end portions of the retainer to have inner and outer ends fitted therein, a seal lip made of a relatively soft material and spanning between the inner and outer ends of the mounting base and cooperating therewith to form a hollow weatherstrip configuration, the seal lip having a main lip portion for contact with the window and an outer lip portion for preventing outward movement of the window glass in its closed position, and a glass holder made of a relatively hard material and embedded in the mounting base and the seal lip in such a manner as to extend from the outer lip portion of the seal lip to the inner end of the mounting base via the outer end of same, the glass holder being supported at two points on the inner and outer end portions of the retainer.

The above described weatherstrip is quite effective for overcoming the above noted disadvantage inherent in the prior art weatherstrip.

It is accordingly an object of the present invention to provide a novel and improved weatherstrip for providing a seal between a roof side rail and a slidable window of an automotive vehicle which can prevent the above noted outward movement of the window glass sufficiently and desirably.

It is another object of the present invention of the above described character which is excellent in durability and can effect an assured and reliable seal in a long period of usage.

DETAILED DESCRIPTION OF THE PREFERRED EMBODIMENTS

Figure 1:
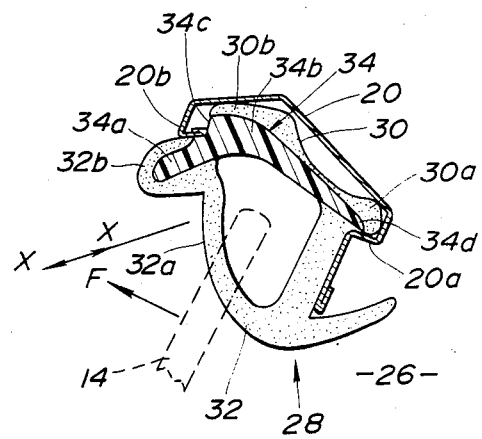
FIG. 1 is a sectional view taken along the line I—I in FIG. 4 and showing a weatherstrip according to an embodiment of the present invention, with the relative location of the window in a closed position shown in dashed line and with some adjacent parts similar to those in FIG. 3 being omitted.

Referring to FIG. 1, a weatherstrip 28 of this invention is secured to the roof side rail 16 (refer to FIG. 2) by means of the retainer 20. The weatherstrip 28 consists of a mounting base 30, a seal lip 32 and a glass holder 34. The mounting base 30 extends between the channel-shaped inner and outer end portions 20a, 20b of the retainer 20 to have inner and outer ends 30a, 30b received therein. The seal lip 32 is arranged to span between the inner and outer ends 30a, 30b of the mounting base 30 and to cooperate with the mounting base 30 to form a hollow weatherstrip configuration so that, when the door 10 is swung closed and the window glass 14 is slid up to its closed position, the seal lip 32 contacts the peripheral edge of the window glass 14 while being resiliently deformed to provide a seal between the inside and outside of the vehicle cabin 26.

More specifically, the seal lip 32 includes a main lip portion 32a put into contact with the window glass 14 when the door 10 is swung closed and the window glass 14 is slid up to its closed position, and an outer lip 32b located between the outer end of the main lip portion 32a located between the outer end of the main lip portion 32a and the outer end of the mounting base 30 to prevent outward movement of the window glass 14 during high-speed running of the vehicle.

The glass holder 34 is made of a hard synthetic resinous material and embedded in the mounting base 30 and the seal lip 32 which are made of sponge rubber. The glass holder 34 is formed integral with the mounting base 30 and the seal lip 32, i.e., joined with the same so as to form an integral unit upon moulding of the mounting base 30 and the seal lip 32. More specifically, the glass holder 34 has an L-like cross section and has an outer lip core portion 34a embedded in the outer lip portion 32b of the seal lip 32 and a base portion 34b embedded in the mounting base 30 and extending between the inner and outer end portions 20a, 20b of the retainer 20. The outer lip core portion 34a is entirely covered by the outer lip portion 32b so as not to be exposed to the outside of the weatherstrip 28, whereas the base portion 34b is partly uncovered by the mounting base 30 so as to have an outer end 34c exposed to the outside of the weatherstrip 28 and directly contacting the outer end portion 20b of the retainer 20. An inner end 34d of the base portion 34b is fitted in the channel-shaped inner end portion 20a of the retainer 20 together with the inner end 30a of the mounting base 30 and is exposed to the outside of the weatherstrip 28 so as to directly contact the inner end portion 20a of the retainer 20. The inner end 34d of the base portion 34b of the glass holder 34, when put into contact with the inner end portion 20a of the retainer 20, prevents rotation or swing of the glass holder 34 in a predetermined direction (i.e., in the clockwise direction in FIG. 1) about the outer end 34c.

Figure 4:
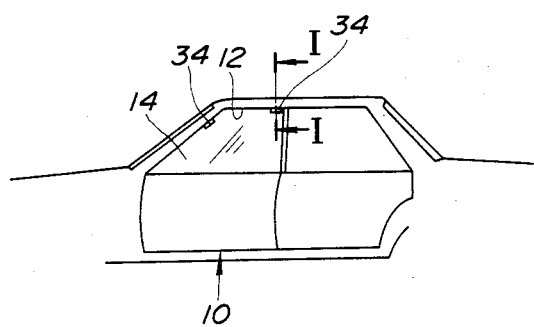
FIG. 4 is a fragmentary side elevational view of a 4-door hardtop vehicle to which the weatherstrip of this invention is applicable.
Figure 5:
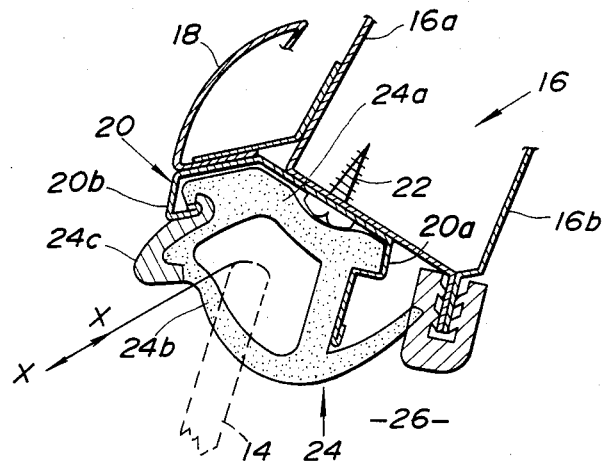
FIG. 5 is a view similar to FIG. 1 but showing a prior art weatherstrip.
Figure 6:
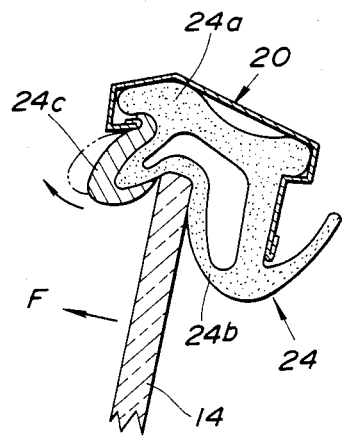
FIG. 6 is a sectional view showing the prior art weatherstrip in a state to which it is put when its associated vehicle door is swung closed and a window glass is slid up to its closed position.

The weatherstrip 28 is provided with two glass holders 34 in the places as indicated in FIG. 4.

From the foregoing, it is to be understood that since the glass holder 34 is supported at both ends 34c, 34d thereof by the retainer 20 and prevented from rotation or swing in a predetermined direction about the outer end 34c, the weatherstrip 28 can prevent the outward movement of the window glass 14 sufficiently and desirably.

It is further to be understood that since the outer lip portion 32b of the seal lip 32 is adapted to entirely cover the outer lip core portion 34a of the glass holder 34, a crack or cracks are hardly caused in the weatherstrip 28 at the joint between the seal lip 32 and the glass holder 34 even after a long period of usage.

Figure 2:
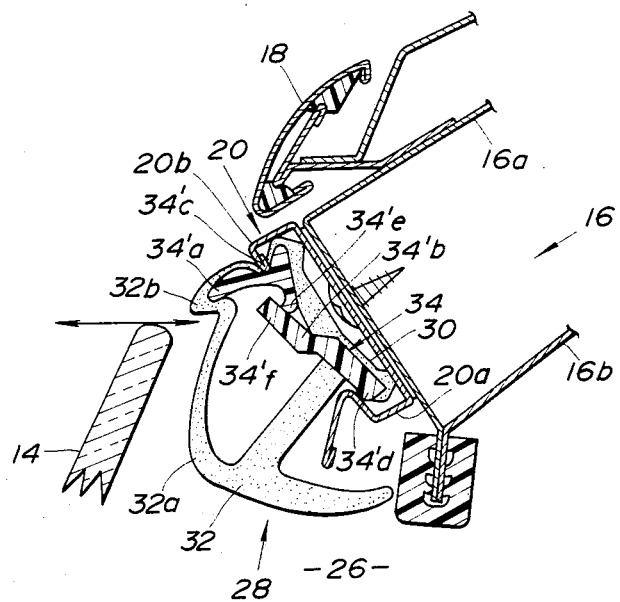
FIG. 2 is a view similar to FIG. 1 but showing a modification in a state to which it is put when its associated vehicle door is swung open and a window glass is moved up to its closed position.

Referring to FIG. 2, in which like or corresponding parts to those of the previous embodiment are designated by like reference characters, a modified embodiment of the present invention will be described hereinafter. This embodiment differs from the previous embodiment in that the glass holder 34' consists of two separate parts, i.e., a first holder member 34'a and a second holder member 34'b. The first holder member 34'a is substantially L-shaped in cross section and partly embedded in the outer lip portion 32b of the seal lip 32 to serve as a core thereof while being partly embedded in the mounting base 30 to have an outer end 34'c fitted in the channel-shaped outer end portion 20b of the retainer 20 and an inner end 34'e located between the inner and outer end portions 20a, 20b of the retainer 20. The outer end 34'c of the first holder member 34'a is directly engaged with the outer end portion 20b of the retainer 20 so that the first holder 34'a is rotatable about the outer end 34'c thereof. The second holder member 34'b is embedded in the mounting base 30 and having a nearly straight elongated cross section and an inner end 34'd fitted in the channel-shaped inner end portion 20a of the retainer 20 and an outer end 34'f over which the inner end 34'e is lapped.

Figure 3:
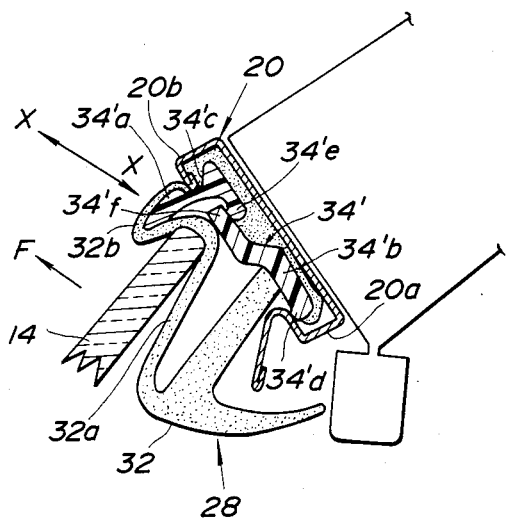
FIG. 3 is a view similar to FIG. 1 but showing the modification in a state to which it is put when the vehicle door is swung closed and the window glass is moved up to its closed position.

With the above modification, when the door 10 is swung closed and the window glass 14 is slid up to its closed position, the seal lip 32 contacts the peripheral edge of the window glass 14 while being resiliently deformed to provide a seal between the inside and outside of the vehicle cabin 26 as shown in FIG. 3. When this is the case, the outer end 34'f of the second holder member 34'b is pushed up by the peripheral edge of the window glass 14 via its adjacent part of the seal lip 32 and rotated into an operating position in FIG. 3 through rotation in the clockwise direction about the outer end 34'd. This in turn allows the first holder member 34'a to be rotated into an operating position in FIG. 3 through rotation in the anticlockwise direction about the outer end 34'c.

This embodiment can prevent outward movement of the window glass 14 in its closed position more assuredly than the previous embodiment since, when the window glass holder 34 is urged to rotate in the clockwise direction in FIG. 3 about the outer end 34'c and pushes the outer end 34'f of the second holder member 34'b and its adjacent part of the seal lip 32 against the peripheral edge of the window glass 14 to prevent the outward movement of the window glass 14, i.e., movement of the outer end 34'f of the second holder member 34'b and its adjacent part of the seal lip 32 interferes with outward movement of the window glass 14 to prevent the same. In other words, the first and second holder members 34'a, 34'b are so constructed and arranged as to allow the outer end 34'f of the second holder member 34'b and its adjacent part of the seal lip 32 to move into the path which the peripheral edge of the window glass 14 would follow if the window glass 14 held in its closed position should move outward due to a pressure differential between the inside and outside of the vehicle cabin 26 during high-speed running of the vehicle.

What is claimed is:

1. A weatherstrip for providing a seal between a roof side rail and a slidable automotive vehicle window and adapted to be installed on the roof side rail by means of a retainer having channel-shaped inner and outer ends, said weatherstrip comprising:
- a mounting base made of a relatively soft material land extending between the inner and outer end portions of the retainer to have inner and outer ends fitted therein;
- a seal lip made of a relatively soft material and spanning between the inner and outer ends of said mounting base and cooperating therewith to form a hollow weatherstrip configuration;
- said seal lip having a main lip portion for contact with said window and an outer lip portion for preventing outward movement of the window glass in its closed position; and
- a glass holder made of a relatively hard material and including portions embedded in said mounting base and said seal lip in such a manner as to extend from said outer lip portion of said seal lip along said mounting base to the inner end of said mounting base, said glass holder being supported at two points on the inner and outer end portions of the retainer so as to prevent rotation of said glass holder in one direction about the outer end portion of the retainer.

2. A weatherstrip as set forth in claim 1 wherein said glass holder is L-shaped in cross section and having an outer lip core portion embedded in said outer lip portion of said seal lip and a base portion embedded in said mounting base, said base portion extending between the inner and outer end portions of the retainer to have inner and outer ends directly in contact with the inner and outer end portions of the retainer.

3. A weatherstrip as set forth in claim 2 wherein said outer lip core portion is entirely covered by said outer lip portion of said seal lip and prevented from being exposed to the outside of said weatherstrip.

4. A weatherstrip as set forth in claim 3 wherein said base portion of said glass holder is partly uncovered by said mounting base to have said inner and outer ends exposed to the outside of said weatherstrip.

5. A weatherstrip as set forth in claim 4 wherein said inner and outer ends of said glass holder contact the inner and outer end portions of the retainer.

6. A weatherstrip as set forth in claim 1 wherein said glass holder consists of first and second holder members which are independent from each other, said first holder member having an L-like cross section and being partly embedded in said outer lip portion of said seal lip while being partly embedded in said mounting base to have an outer end fitted in the outer end portion of the retainer and an inner end located between the inner and outer end portions of the retainer, said second holder member being embedded in said mounting base and having a nearly straight elongated cross section, an inner end fitted in the inner end portion of the retainer, and an outer end over which the inner end of said first holder member is lapped.

7. A weatherstrip as set forth in claim 6 wherein said first and second holder members are partly uncovered by said mounting base so that the outer end of said first holder member and the inner end of said second holder member directly contact the inner and outer end portions of the retainer, respectively.

8. A weatherstrip as set forth in claim 7 wherein said first holder member is rotatable about the outer end thereof while said second holder member being rotatable about the inner end thereof.

9. A weatherstrip as set forth in claim 8 wherein said first and second holder members are adapted to be pushed by the window and its adjacent part of said seal lip so as to be rotated into their operating positions through rotation in opposite directions when the window is moved into its closed position.

10. A weatherstrip as set forth in claim 1 wherein said mounting base and said seal lip are made of sponge rubber and said glass holder is made of a hard synthetic resinous material.

11. A weatherstrip as set forth in claim 1 wherein said glass holder is L-shaped in cross section and having an outer lip core portion embedded in said outer lip portion of said seal lip and a base portion embedded in said mounting base.

* * * * *